No. 771,831. PATENTED OCT. 11, 1904.
F. O. ROBERTS.
BELT JACK.
APPLICATION FILED APR. 23, 1904.
NO MODEL.
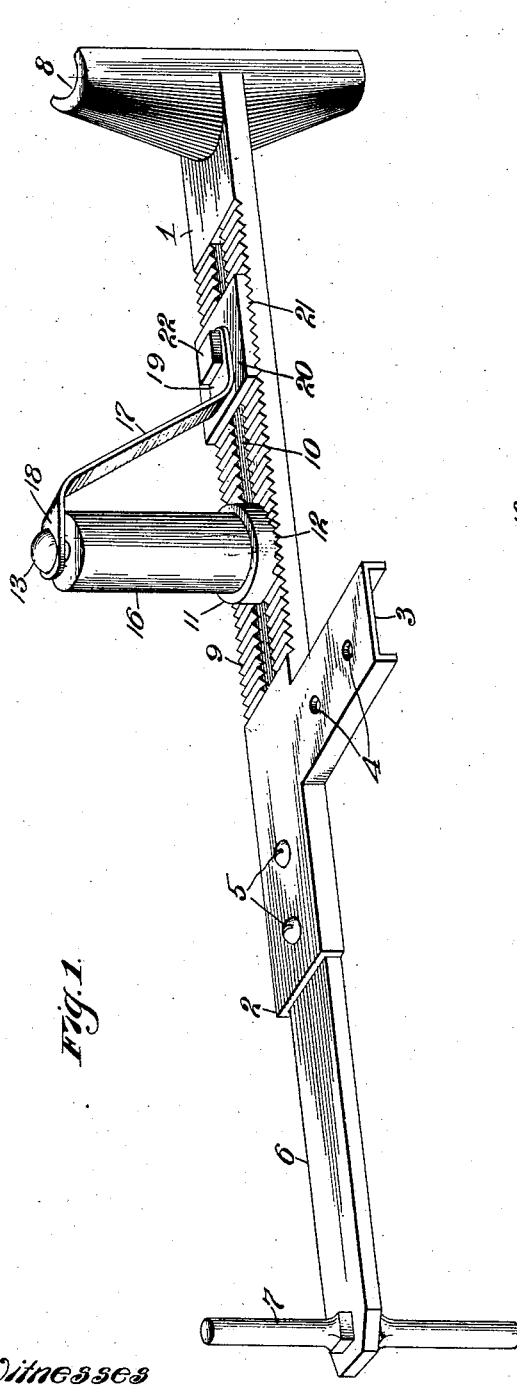
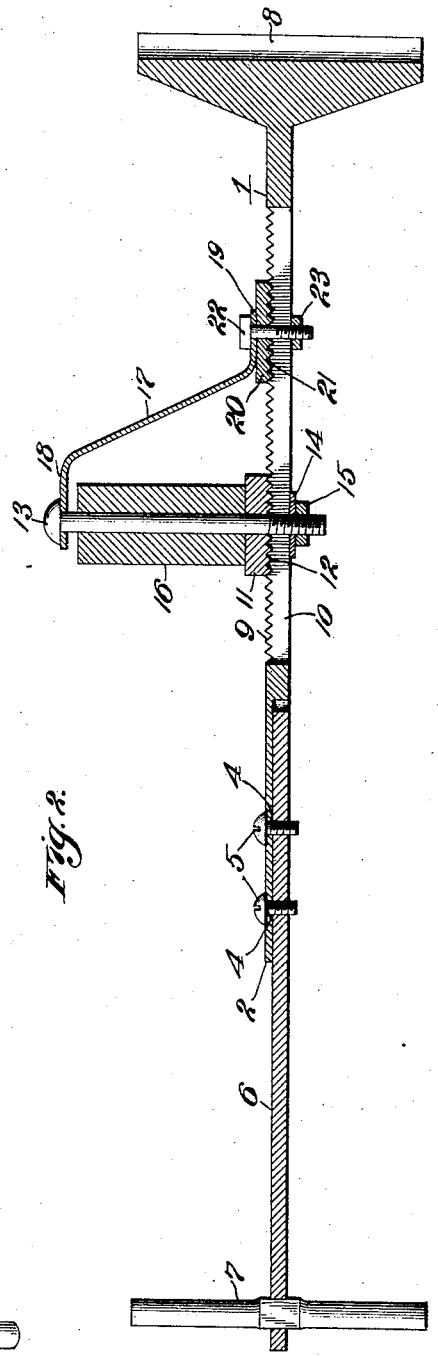
Witnesses
F. R. Glow
H. C. Rodgers
Inventor:
F. O. Roberts.
By George F. Thorpe
Atty.

No. 771,831. Patented October 11, 1904.

UNITED STATES PATENT OFFICE.

FREDERICK O. ROBERTS, OF MELVERN, KANSAS.

BELT-JACK.

SPECIFICATION forming part of Letters Patent No. 771,831, dated October 11, 1904.

Application filed April 23, 1904. Serial No. 204,646. (No model.)

*To all whom it may concern:*

Be it known that I, FREDERICK O. ROBERTS, a citizen of the United States, residing at Melvern, in the county of Osage, and in the State of Kansas, have invented a new and useful Belt-Jack, of which the following is a specification.

My invention relates to belt-jacks; and my object is to produce a device of this character by which a belt can be placed upon a pulley easily and quickly and which is adjustable to accommodate pulleys of varying dimensions.

A further object is to produce a device of this character of simple, strong, durable, and cheap construction.

To these ends the invention consists in certain novel and peculiar features of construction and organization, as hereinafter described and claimed, and in order that it may be fully understood reference is to be had to the accompanying drawings, in which—

Figure 1 is a perspective view of a belt-jack embodying my invention. Fig. 2 is a central longitudinal section of the same.

In the said drawings, 1 designates a lever terminating at one end in a longitudinally-channeled portion 2 and in a laterally-projecting channeled portion 3, said portions having a plurality of holes 4 to receive screw-bolts 5 for securing in either of said channeled portions the lever extension 6, equipped with handles 7 at its rear end. By this arrangement the lever extension may be disposed in longitudinal alinement with the lever proper or at right angles thereto, as in some instances it will be found more convenient to have the jack perfectly straight, while in others it will be found more convenient to have it of angular form—that is, with the handle-carrying extension extending at an angle to the lever proper.

At its front end the lever is provided with a lateral enlargement 8, having its front face concaved for convenient and reliable engagement with the shaft (not shown) on which the pulley to be belted is mounted. One face of the lever is provided with transversely-extending teeth 9, and said toothed portion is longitudinally slotted, as at 10.

11 designates a washer provided with transverse teeth 12 in its under side for engagement with certain of the teeth 9, and extending through said washer parallel with groove 8 is a headed bolt 13, said bolt extending also through the slot 10 and being engaged at its threaded end by a washer 14 and nut 15, the latter clamping the washer against the non-toothed side of the lever.

16 designates a roller journaled upon the bolt 13 and between washer 11 and the end 18 of a brace 17, said end of the brace being mounted on the bolt. The opposite end of the brace has an end 19 bearing against a plate 20, provided with teeth 21, engaging some of the teeth 9, and said plate and brace portion are held in position by means of the bolt 22, extending through them and through slot 10 and engaged at its opposite end by the clamping-nut 23.

In disposing a belt upon a pulley the roller 16 must first be adjusted with relation to bearing or concave surface of the enlargement 8 to accommodate the pulley to be belted and then secured in such position by the proper manipulation of nuts 15 and 23. The enlargement is then engaged with the shaft and the belt brought around roller 16 contiguous to the side of the pulley. The jack is then rotated like a crank to slip the belt onto the pulley as the roller swings around in substantially the same plane as the periphery of the pulley, which operation can be performed quickly and easily.

From the above description it will be apparent that I have produced a belt-jack possessing the features of advantage enumerated as desirable in the statement of invention and which is obviously susceptible of modification in minor particulars without departing from the principle of construction involved or sacrificing any of its advantages.

Having thus described the invention, what I claim as new, and desire to secure by Letters Patent, is—

1. A belt-jack, comprising a lever having an enlargement at its front end provided with a concaved face and having one side toothed transversely, and an extension at the rear end of said lever, a handle secured to said extension, a toothed washer engaging the toothed face of the lever, a bolt adjustable on said lever and extending through the same and said washer, an adjustable brace secured rigidly to said lever and engaging said bolt, and a roller journaled on said bolt.

2. A belt-jack, comprising a lever having an enlargement at its front end provided with a concaved face and having one side toothed transversely, and an extension at the rear end of said lever, a handle secured to said extension, a toothed washer engaging the toothed face of the lever, a bolt adjustable on the lever and extending through the same and said washer, a plate provided with transverse teeth engaging the teeth or corrugations of the lever, a bolt extending through said plate and lever and adjustable on the latter, a brace mounted at its opposite ends on said bolts, and a roller journaled on the bolt extending through said washer and between the brace and the latter.

3. A belt-jack, comprising a lever having an enlargement at its front end provided with a concaved face and having one side toothed transversely, and having its rear end channeled, an extension for the lever secured in said channeled end, a handle secured to said extension, a toothed washer engaging the toothed face of the lever, a bolt adjustable on the lever and extending through the same and said washer, an adjustable brace secured rigidly to said lever and engaging said bolt, and a roller journaled on said bolt.

4. A belt-jack, comprising a lever having at its front end an enlargement provided with a concaved face, and having a longitudinal slot, and one side toothed transversely, a toothed washer bridging said slot and engaging the teeth of the lever, a bolt extending through said washer and the slot, a roller journaled on said bolt between its head and the washer, a plate bridging the slot and provided with teeth engaging the teeth of the lever, a bolt extending through said plate and said slot, a brace mounted at its opposite ends upon said bolts and between their heads and the roller and plate, and clamping-nuts engaging the threaded ends of the bolts at the opposite side of the lever.

In testimony whereof I affix my signature in presence of two witnesses.

FREDERICK O. ROBERTS.

Witnesses:
J. M. BURTON,
W. O. STEPHENS.